(No Model.)
A. JOHNSTON.
MAIL BAG.
No. 574,064. Patented Dec. 29, 1896.
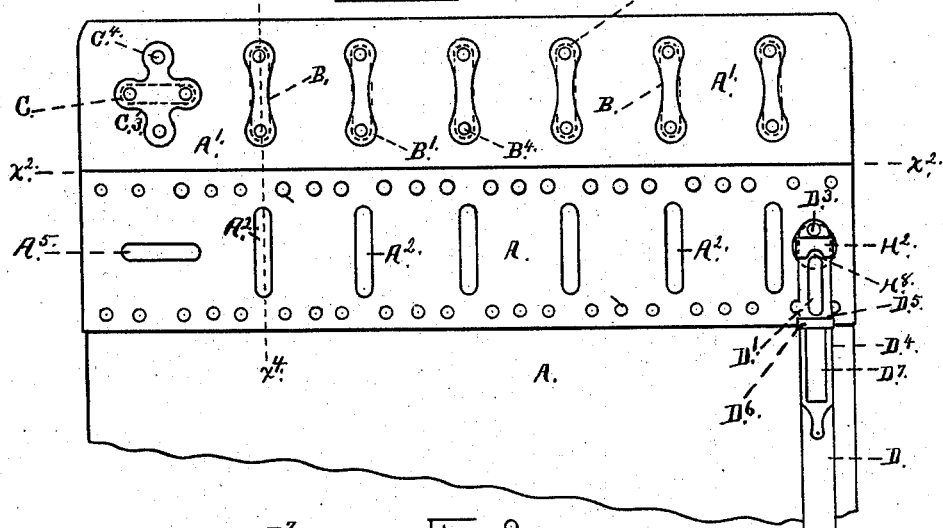
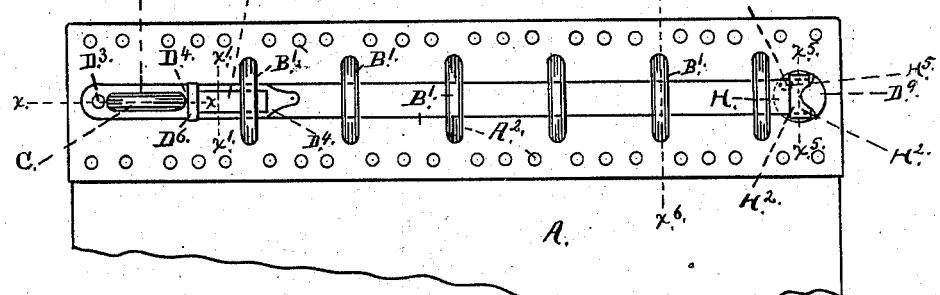
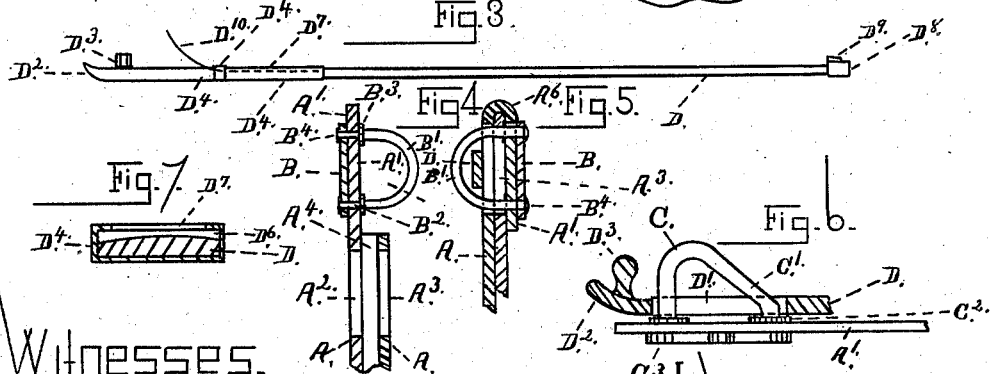
Witnesses
E. T. Thomas,
L. Heusel.
Inventor
Abner Johnston
By
E. T. Thomas
Atty.

United States Patent Office.

ABNER JOHNSTON, OF JERSEY CITY, NEW JERSEY, ASSIGNOR OF SEVEN-TEEN-TWENTIETHS TO HERMAN HORLBECK, EDWARD KELLY, GEORGE B. FIELDER, AND ADOLPH R. BRAUNSTEIN, OF SAME PLACE.

MAIL-BAG.

SPECIFICATION forming part of Letters Patent No. 574,064, dated December 29, 1896.

Application filed August 1, 1895. Serial No. 557,916. (No model.)

*To all whom it may concern:*

Be it known that I, ABNER JOHNSTON, a citizen of the United States, and a resident of Jersey City, county of Hudson, and State of New Jersey, have invented a new and useful Improvement in Mail-Bags, of which the following is a specification.

The object of this invention is to produce a mail-bag which can be rapidly opened and closed.

The invention consists in providing a mail-bag with a turning and sliding hasp, a hasp-check holder, and an inclined staple.

Figure 1 shows the mail-bag opened and the hasp drawn. Fig. 2 represents the mail-bag closed and the hasp in place ready to be locked. Fig. 3 is an edge view of the hasp removed from the mail-bag. Fig. 4 is a vertical sectional view of Fig. 1 on line $x^4\ x^4$, representing the mail-bag as opened. Fig. 5 is a vertical sectional view of Fig. 2 on line $x^6\ x^6$, representing the mail-bag as closed. Fig. 6 is a horizontal sectional view of Fig. 2 on line $x\ x$, showing the hasp and lock-staple when ready to lock. Fig. 7 is a cross-sectional view of the hasp as shown in Fig. 2, line $x'\ x'$. Fig. 8 is a top view of the hasp-swivel, and Fig. 9 is a cross-sectional view of the hasp-swivel and fastenings securing the hasp-swivel to the bag.

A in the several figures represents part of an ordinary leather bag for holding mail-matter while being transferred from one post-office or station to another. The bag is of ordinary construction, being made of fibrous material and having one side $A'$, Figs. 1 and 4, at its open end longer than the other, which is folded over upon the short side when the mail-bag is closed, as shown in Figs. 2 and 5.

$A^2\ A^2$, Fig. 1, are longitudinal staple-holes cut through both sides of the bag at or near the top opposite each other, as shown in Figs. 4 and 5, which allow the staples B to pass through when the lap $A'$ is folded, as shown in Fig. 5.

$A^5$, Fig. 1, are horizontal staple-holes cut through both sides opposite each other and in the same line as holes $A^2$.

$B'\ B'$, Figs. 2, 4, and 5, are V-formed staples having tenons $B^2$, and are secured to the lap $A'$ of the bag by washers B and $B^3$, as shown in Fig. 4.

C, Fig. 6, is a staple secured to the lap $A'$ of the bag by plates $C^2$ and $C^3$ and is set horizontal to fit the holes $A^5$, as shown in Fig. 2. The inner side of this staple forms an incline plane $C'$, Fig. 6, which starts at a lower level than the bent-up end $D^2$ of the hasp D. By this arrangement the hasp when pushed through the several staples $B'$ automatically slides along the inclined surface $C^6$ until the hole $D'$ of the hasp permits it to drop down in position, as shown in Fig. 6, ready for the lock.

D in the several figures is a sliding and pivoted hasp made from material of sufficient stiffness to be pushed through the several staples while being held by the metal tip $D^8$. By this construction the slow and tedious process of lacing from staple to staple, as in old methods, is avoided. This hasp is bound with metal tips $D^4$ and $D^8$. The tip $D^4$ is bent up at $D^2$, which enables the hasp to slide upon the staple, as shown in Figs. 3 and 6. The lug $D^3$ prevents the hasp from being drawn out of the hasp guide or swivel $H^2$. The tip $D^8$ is provided with a check-lug $D^9$, which comes in contact with the swivel-guide $H^2$ at $H^8$, Fig. 8, and prevents the hasp from going too far. The hasp is also provided with a recess $D^7$, Figs. 2 and 7, in which is placed a card designating the postoffice or station to which the bag is to be delivered. The card is put in place by slipping it under the band $D^4$, as shown by the curved and dotted line $D^{10}$, Fig. 3. In order that the card may be more firmly held in place, I convex the hasp immediately under the opening or recess $D^7$, as shown in Fig. 7.

H and $H^7$ are plates secured to the bag A by rivets $H^6$, Fig. 9, and support the hasp-guide $H^2$ by means of the pivot $H'$ and washer $H^3$. The hasp-guide $H^2$ is adjustably held and is formed with a mortise $H^4$, through which the hasp D passes or slides when the bag is fastened or unfastened.

$H^5$, Figs. 2, 8, and 9, is a hasp-guide pin which stops the hasp-guide and brings the hasp in line with the staples $B'$ when it is swung around from its vertical position, as shown in Fig. 1, to a parallel line with the staples, as in Fig. 2.

The closing and opening of the bag is as follows: The lap A' is folded on line $x^2$ $x^2$, Fig. 1, around until the staples pass through the cuts $A^2$ and $A^5$, as shown in Fig. 5. The hasp D is then swung from its vertical position, as in Fig. 1, to the right and slid into the staples B' and over the inclined staple C, as shown in Figs. 2 and 6. The hasp is then locked. The opening is down by lifting the hasp off the staple C and drawing it out of the staples B' and swinging it around out of the way, as shown in Fig. 1.

I make the trimmings out of aluminium, as by so doing a large amount of weight is saved in transportation, as the aluminium is three times as light as any other metal that could be used, thereby saving the users annually a large amount.

Having thus fully described my invention, what I claim as new, and desire to secure by Letters Patent, is—

1. A mail-bag provided with the slots $A^2$ and $A^5$, the staples B' for holding the hasp D, the staple C having one edge C' inclined and the said staple C set at right angles to the staples B', in combination with the sliding hasp D having a curved tip $D^2$ as and for the purpose described.

2. A mail-bag provided with the slots $A^2$ and $A^5$, the staples B' for holding the hasp D, the staple C having one edge C' inclined and the said staple C set at right angles to the staples B', in combination with the pivoted and sliding hasp D as and for the purpose described.

3. A mail-bag provided with the staple B' and staple C in combination with the sliding and turning hasp having and being held in place by the hasp-guide $H^2$ as and for the purpose described.

4. A mail-bag provided with the slots $A^2$ and $A^5$ the staple B' staple C and stop-pin $H^5$ in combination with the pivoted and sliding hasp D having and being held in place by the hasp-guide $H^2$ the said hasp-guide being prevented from turning too far by the pin $H^5$, as and for the purpose described.

5. A mail-bag provided with the slots $A^2$ and $A^5$ the staple B' and staple C having inclined wall C' in combination with the hasp D having recess $D^7$, and the turning hasp-guide $H^2$ as and for the purpose described.

In testimony that I claim the foregoing as my invention I have signed my name, in presence of two witnesses, this 12th day of July, 1895.

ABNER JOHNSTON.

Witnesses:
E. T. THOMAS,
L. HENSEL.